US012707230B2

(12) United States Patent
Guionnet et al.

(10) Patent No.: US 12,707,230 B2
(45) Date of Patent: Aug. 11, 2026

(54) METHOD AND DEVICE FOR RECOMMENDING ACTIVITIES TO AT LEAST ONE USER

(71) Applicant: Orange, Issy-les-Moulineaux (FR)

(72) Inventors: Chantal Guionnet, Chatillon (FR); Alain Guionnet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 272 days.

(21) Appl. No.: 18/517,627

(22) Filed: Nov. 22, 2023

(65) Prior Publication Data

US 2024/0179491 A1 May 30, 2024

(30) Foreign Application Priority Data

Nov. 25, 2022 (FR) ...................................... 2212340

(51) Int. Cl.
*H04W 4/021* (2018.01)
*G06N 3/02* (2006.01)

(52) U.S. Cl.
CPC .............. *H04W 4/021* (2013.01); *G06N 3/02* (2013.01)

(58) Field of Classification Search
CPC ................................ H04W 4/021; G06N 3/02
USPC ...................................................... 455/456.3
See application file for complete search history.

(56) References Cited

U.S. PATENT DOCUMENTS 10,812,279 B1 * 10/2020 Walters ................. H04L 65/403
2018/0165520 A1 * 6/2018 Meisser ................. H04N 7/147
2019/0182616 A1 * 6/2019 Kamath ................ H04L 67/306

OTHER PUBLICATIONS

French Search Report dated May 24, 2023 for Application No. 2212340.
Florea et al., "Multimodal Deep Learning for Group Activity Recognition in Smart Office Environments", Future Internet 2020, 12(8), 133; https://doi.org/10.3390/fi12080133.

* cited by examiner

*Primary Examiner* — Michael R Neff
(74) *Attorney, Agent, or Firm* — Knobbe, Martens, Olson & Bear, LLP

(57) ABSTRACT

A method and a device for recommending activities to at least one user are described. A detection of at least one first ongoing activity in a first location based on data measured by at least one sensor triggers the sending, to at least one terminal of said at least one user located in a second location, of at least one activity recommendation. The at least one activity recommendation is generated as a function of the at least one first activity, and at least one link between the at least one user and the at least one first activity.

14 Claims, 4 Drawing Sheets

[Fig. 1A]
SYS
LOC_A
SENS_A
PERS_X
PERS_Y
DATA_A
APP
DET
ACT_A
OBT
LNK
GEN
REC_1
LOC_B
UE_1
USR_1
[Fig. 1B]
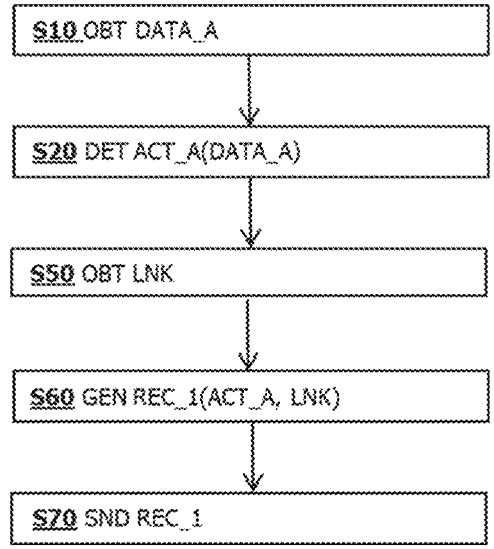

[Fig. 2A]
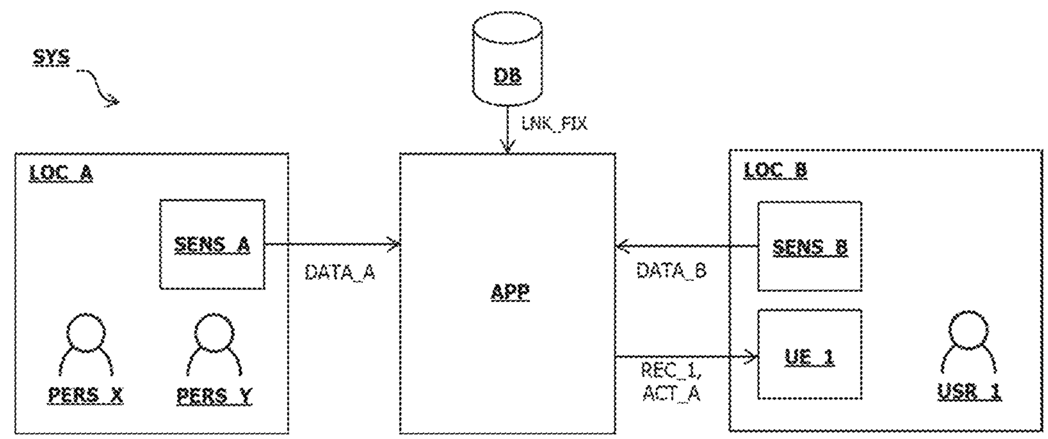
[Fig. 2B]
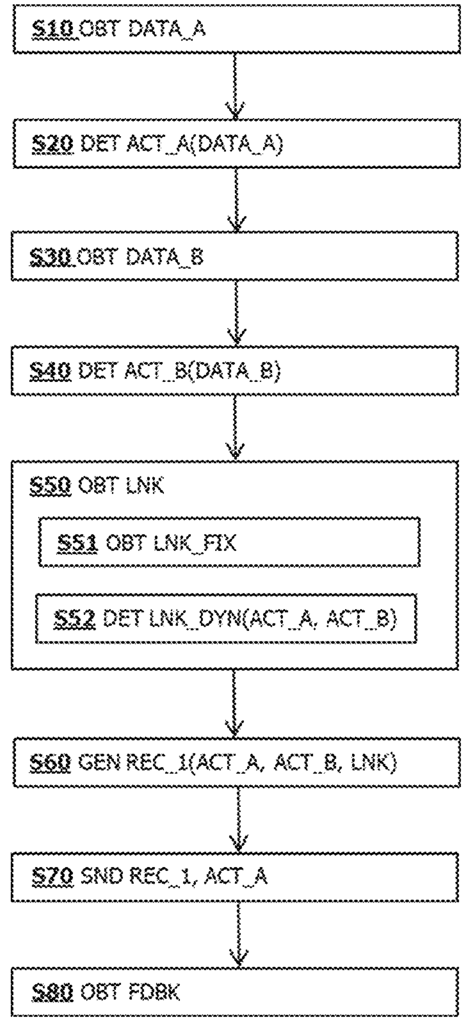

[Fig. 3A]
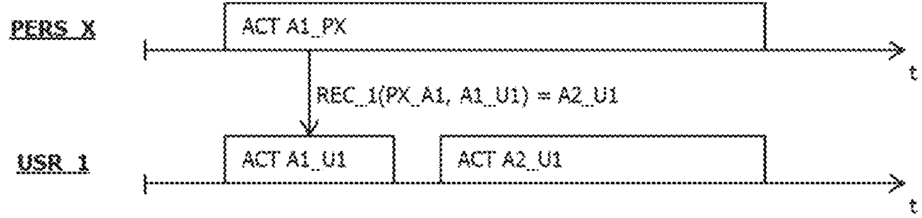
[Fig. 3B]
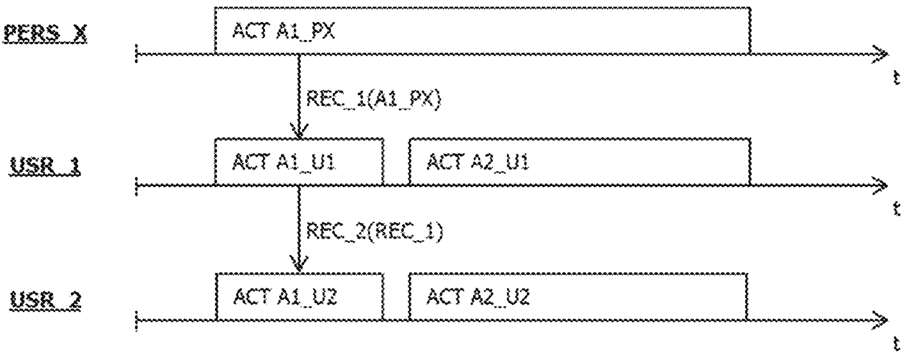
[Fig. 3C]
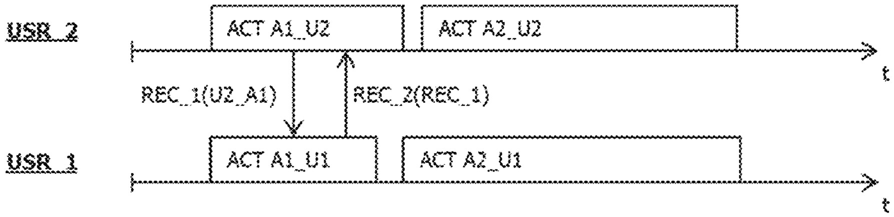

[Fig. 4]
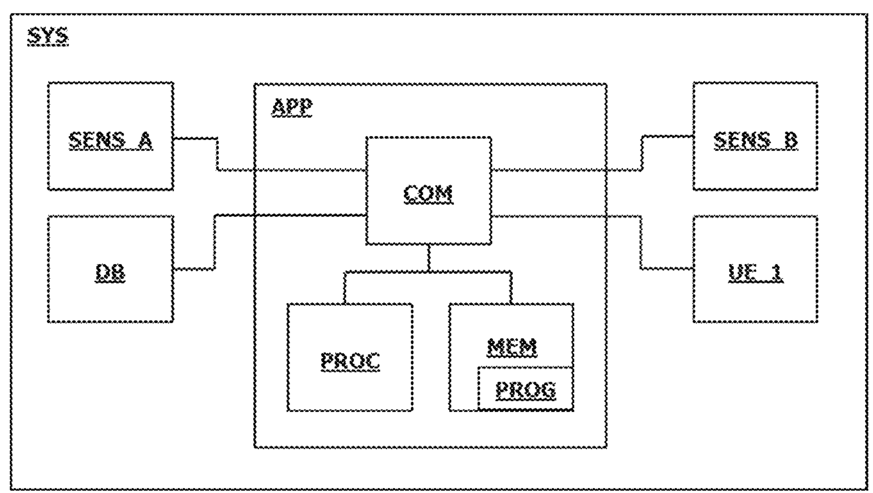
[Fig. 5]
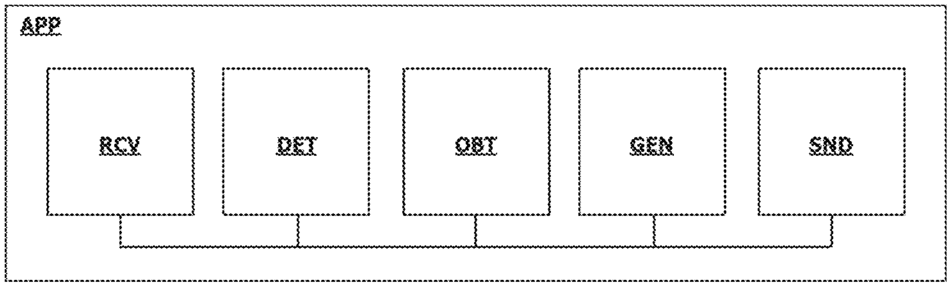

METHOD AND DEVICE FOR RECOMMENDING ACTIVITIES TO AT LEAST ONE USER

TECHNICAL FIELD

The disclosed technology relates to the field of information processing. More particularly, the disclosed technology relates to a method and a device for recommending activities to at least one user, as well as associated system, computer program and recording medium. The disclosed technology applies advantageously to, but is not limited to, the implementation of decision support systems.

DISCUSSION OF RELATED TECHNOLOGY

In the current state of the art, it is known to broadcast, to a set of users, information indicating that an activity is being performed by persons located in a remote location. For example, the solution proposed in the document Florea et al., "Deep Learning for Group Activity Recognition in Smart Office Environments", Future Internet, 2020, allows to broadcast information indicating that several persons are participating in a meeting in a certain conference room.

However, such information is broadcast as indication only. In this case, each of the users takes note of the activity, then analyzes it to determine whether or not it is necessary to perform an action accordingly. However, when an ongoing activity is broadcast to a large set of users and requires performing an action, it is frequent that a certain number of users make bad decisions. Using the example above, a user could mistakenly consider that his presence at the meeting is not necessary and, in fact, miss a meeting in which his participation was expected. It therefore appears essential to help in real time users in their decision-making.

In the particular context of decision support, various existing systems propose for a user recommendations established on the basis of actions previously performed by the user or other persons. In particular, it is common for video-on-demand platforms to recommend to the users a list of films to watch. Typically, such recommendations are generated based on the viewing history of the user, and on the viewing histories of other users of the platform.

However, the relevance of the recommendations produced by the existing decision support systems is not fully satisfactory, in particular for the following reasons. Indeed, the recommendations proposed to a user by these systems are generated solely based on past actions. For this reason, the recommendations generated are frequently obsolete and of little relevance to the user. Moreover, the existing systems only reproduce actions already performed by one or more users. Thus, if a user is confronted with an unprecedented situation, the recommendations proposed will be of no interest and will not help the user in his decision-making in an appropriate manner.

Therefore, there is a need for a decision support system making it possible to provide in real time up-to-date and relevant recommendations for a user.

SUMMARY

The disclosed technology aims to overcome all or part of the drawbacks of the prior art, in particular those described previously.

According to an aspect of the disclosed technology, a method for recommending activities to at least one user is provided, in which a detection of at least one first ongoing activity in a first location based on data measured by at least one sensor triggers:

the sending (via a communication network), to at least one terminal of said at least one user located in a second location, of at least one activity recommendation generated as a function of;

said at least one first activity, and at least one link between said at least one user and said at least one first activity.

The disclosed technology proposes to provide a user with an activity recommendation as a function of a detected activity in a remote location. Particularly, it should be pointed out that the detection of the activity performed in the remote location triggers the generation and the sending of the recommendation, which allows to provide in real time a recommendation to the user. Furthermore, the recommendation proposed to the user is generated both as a function of: the detected ongoing activity, and the link between the user and the detected activity, which allows to obtain an up-to-date and personalized recommendation for the user.

Thus, the disclosed technology allows to provide in real time up-to-date and personalized activity recommendations for a user by taking into account ongoing activities in a remote location.

In particular, the disclosed technology applies advantageously to the implementation of real-time decision support systems, for example allowing optimization of the hardware (e.g. meeting rooms in a building) or time (e.g. schedule of a user) resources.

According to one embodiment, one said activity recommendation is sent only to a user. As a variant, one said activity recommendation is sent to a plurality of users.

According to one embodiment, one said first activity is an activity performed by one or more persons located in the first location (e.g. the beginning of a presentation). As a variant, said first activity is an activity associated with the first location, and thus with a change in the first location (e.g. running of a slide show).

According to one embodiment, said at least one activity recommendation is further generated as a function of a second detected activity being performed by said at least one user.

According to this embodiment, the activity of a user is detected, then used to generate the activity recommendation sent to the user. In this way, this embodiment allows to dynamically adapt the activity recommendations provided to a user as a function of his current situation. Thus, this embodiment contributes to improving the relevance of the activity recommendations proposed to the user.

According to one embodiment, said at least one link (between said at least one user and said at least one first activity) comprises a link so-called fixed link between said at least one user and at least one person associated with said at least one first activity, the fixed link being recorded in a database and being obtained based on an identifier of said at least one user and on an identifier of said at least one person (associated with said at least one first activity).

This embodiment is advantageous in that it allows to generate activity recommendations as a function of interpersonal relationships defined in a database. More generally, this embodiment allows to personalize the recommendations provided to the users.

According to one embodiment, said at least one link (between said at least one user and said at least one first activity) comprises a link so-called dynamic link between said at least one user and said at least one first activity, the dynamic link being determined as a function of said at least one user and of said at least one first activity.

This embodiment allows to adapt over time the activity recommendations sent to a user as a function of a current context and thus contributes to providing up-to-date recommendations to the users.

According to one embodiment, the method further comprises the sending, to a terminal of another user (distinct from said at least one user), of another activity recommendation generated as a function: of said at least one activity recommendation (sent to said at least one user) and of a link between the other user and said at least one activity recommendation.

In this embodiment, the activity recommendation proposed to a second user is made as a function of the recommendation proposed to a first user and of the link between these users. In other words, it is proposed here to use an inference mechanism (i.e. chain reaction) between the recommendations provided to the users. This embodiment allows to coordinate the activities of several users. This embodiment is particularly advantageous for collectively optimizing the management of resources shared between several users (e.g. meeting rooms).

According to one embodiment, said at least one activity recommendation and information representative of said at least one first detected activity are sent (via a communication network) to said at least one terminal of said at least one user.

In this embodiment, it is proposed to transmit to the user, in addition to the recommendation, the detected activity having triggered the issuing of this recommendation. In this way, this embodiment allows to contextualize the activity recommendations proposed to the users. This embodiment thus allows to motivate the sending of recommendations to the users and contributes to improving their relevance for the users.

According to one embodiment, said at least one activity recommendation is generated by a neural network.

This embodiment allows to automatically optimize the generation of the recommendations based on training or learning data with a view to improving the relevance of the recommendations provided to the users. In other words, this embodiment allows to automatically learn to generate relevant recommendations for the users.

According to one embodiment, the method comprises an update of parameters (e.g. of the weights) of the neural network based on a data indicating whether or not said at least one user has followed or not said at least one activity recommendation.

According to this embodiment, the neural network is optimized over time (i.e. online supervised training) by taking into account the relevance of the recommendations made to a user, that is to say the acceptance or not of these by the user. Thus, this embodiment is advantageous in that it allows to improve, over time and in a manner specific to a user, the relevance of the recommendations provided to him.

According to one embodiment, said at least one data is obtained by determining whether a third detected activity being performed by said at least one user corresponds to said at least one previously sent activity recommendation.

As a variant, said at least one data can be obtained by receiving a message coming from said at least one terminal of said at least one user, the message indicating whether or not said at least one user has followed said at least one activity recommendation.

According to one embodiment, the first location is a meeting room equipped with said at least one sensor.

This embodiment allows to provide in real-time activity recommendations specific to the course of a meeting or of a presentation for remote users.

According to one embodiment, the method comprises obtaining said data measured by said at least one sensor, said measured data being used to detect said at least one first activity.

This embodiment allows to obtain data derived from sensors allowing the detection of the activities and thus to adapt the detection of the activities as a function of different scenarios.

According to an aspect of the disclosed technology, an activity recommendation device is provided, comprising a transmitter configured, upon detection of at least one first ongoing activity in a first location based on data measured by at least one sensor, to:

send, to at least one terminal of at least one user located in a second location, at least one activity recommendation generated as a function: of said at least one first activity and of at least one link between said at least one user and said at least one first activity.

According to one embodiment, the activity recommendation device implements all or part of the steps of the activity recommendation method conforming to the disclosed technology.

According to an aspect of the disclosed technology, a system is provided, comprising:

an activity recommendation device conforming to the disclosed technology; and at least one terminal configured to receive, from the activity recommendation device, at least one activity recommendation.

According to one embodiment, the system comprises a set of at least one sensor configured to capture measured data and to communicate with said activity recommendation device.

According to one embodiment, one said set of sensors comprises at least one sensor among: a camera; a microphone; a network probe; a pressure sensor; a temperature sensor; a depth sensor; and a thermal camera.

According to an aspect of the disclosed technology, a computer program is provided, including instructions for implementing the steps of a method conforming to the disclosed technology, when the computer program is executed by at least a processor or a computer.

The computer program can be formed of one or more sub-parts stored in the same memory or in distinct memories. The program can use any programming language, and be in the form of source code, object code, or intermediate code between source code and object code, such as in a partially compiled form, or in any other desirable shape.

According to one aspect of the disclosed technology, a computer-readable information medium is provided, comprising a computer program conforming to the disclosed technology.

The information medium can be any entity or device capable of storing the program. For example, the support can include a storage means such as a non-volatile memory or ROM, for example a CD-ROM or a microelectronic circuit ROM, or a magnetic recording means, for example a floppy disk or a hard disk. On the other hand, the storage medium can be a transmissible medium such as an electrical or optical signal, which can be conveyed via an electrical or optical cable, by radio or by a telecommunications network or by a computer network or by other means. The program according to the disclosed technology can be particularly downloaded onto a computer network. Alternatively, the information medium can be an integrated circuit in which the program is incorporated, the circuit being adapted to execute or to be used in the execution of the method in question.

The proposed activity recommendation device, system, computer program and information medium have the advantages described above in relation to the proposed activity recommendation method.

BRIEF DESCRIPTION OF THE DRAWINGS

Other features and advantages of the present disclosed technology will emerge from the description provided below of embodiments of the disclosed technology. These embodiments are given for illustrative purposes and are devoid of any limitation. The description provided below is illustrated by the attached drawings.

FIG. 1A and FIG. 1B respectively represent one example of architecture of a system and steps of an activity recommendation method according to one embodiment of the disclosed technology.

FIG. 2A and FIG. 2B respectively represent one example of architecture of a system and steps of an activity recommendation method according to one embodiment of the disclosed technology.

FIG. 3A, FIG. 3B and FIG. 3C represent examples of data obtained and processed by an activity recommendation system according to one embodiment of the disclosed technology.

FIG. 4 represents one example of software and hardware architecture of an activity recommendation system according to one embodiment of the disclosed technology.

FIG. 5 schematically represents one example of functional architecture of an activity recommendation device according to one embodiment of the disclosed technology.

DESCRIPTION OF THE EMBODIMENTS

The disclosed technology relates to a method and device for recommending activities for a user, and associated system, computer program and information medium.

The disclosed technology particularly applies to the implementation of decision support systems. The following description of the disclosed technology will refer to this particular context, which is given only by way of illustrative example and should not limit the scope of the disclosed technology as described in the present application.

FIG. 1A and FIG. 1B respectively represent one example of architecture of a system and steps of an activity recommendation method according to one embodiment of the disclosed technology.

The activity recommendation system SYS comprises, according to the embodiment illustrated in FIG. 1A: an activity recommendation device APP; a first set of at least one sensor SENS_A; and at least one terminal UE_1.

It should be noted that the first set of sensors SENS_A is located in a first location LOC_A where one or more persons PERS_X, PERS_Y are present, and where said at least one terminal UE_1 is associated with at least one user USR_1 present in a second location LOC_B.

The activity recommendation device APP is configured to provide said at least one user USR_1 with at least one activity recommendation REC_1 following the detection of at least one ongoing activity in the first location LOC_A.

In the context of the disclosed technology, embodiments can be envisaged according to which the first location LOC_A and the second location LOC_B are two distinct locations, or the same location. In the latter case, the device APP allows in particular to propose relevant activity recommendations for persons with visual impairments who are not able to see all the ongoing activities in the location. It is considered below for illustrative and non-limiting purposes that the first LOC_A and the second LOC_B locations are two distinct locations.

The operation of the proposed activity recommendation device APP is detailed below, with reference to the steps in FIG. 1B.

As illustrated in FIG. 1B, and according to one embodiment, the device APP implements the proposed activity recommendation method comprising at least one of the steps S10 to S70 described below.

In step S10, the device APP obtains first data DATA_A measured by the first set of at least one sensor SENS_A.

The term "measured data" is here used to refer to data captured by one or more sensors, or produced based on measurements made by one or more sensors. In the context of the disclosed technology, the measured data allow to detect person or location activities. Typically, the measured data can be captured by connected objects (more commonly referred to by the term IoT, for "Internet of Things").

According to one embodiment, the first set of sensors SENS_A comprises at least one sensor among: a camera; a microphone; a network probe; a pressure sensor; a temperature sensor; a depth sensor; and a thermal camera.

For example, the first location LOC_A can be a meeting room equipped with a camera SENS_A such that the first measured data DATA_A comprise a plurality of images acquired from the meeting room LOC_A.

According to one embodiment, the device APP receives the first measured data DATA_A coming from the set of sensors SENS_A via a communication network.

As a variant, embodiments could be envisaged in which the device APP reads the first measured data DATA_A on a memory of a storage device shared with the first set of sensors SENS_A, or in which the device APP captures the first measured data DATA_A by using the first set of sensors SENS_A integrated into the device APP.

In step S20, a detector DET of the device APP detects, based on the first measured data DATA_A, at least one first ongoing activity ACT_A in the first location LOC_A. In other words, the device APP analyzes the first measured data DATA_A to detect an activity ACT_A.

In the context of the disclosed technology, an activity detected by the device APP is characterized by a description attribute and a detection time. Furthermore, the term "activity" is used to refer to an activity of at least one person or an activity of at least one location.

"Person activity" refers to an action performed by at least one person. An activity detected by the device APP can for example belong to the following set of activities: the beginning or the end of a presentation by a person; a conversation between persons; an entry or exit of a person in a room, a movement or motion of a person, an expression of a person (e.g. a smile). Furthermore, one or more persons may be subjects or complements of a detected activity, e.g. one person designates another person.

"Location activity" here refers to an activity associated with a location, and thus to any changes in the location not associated with a person. For example, an activity associated with a location can belong to the following set of activities: a beginning or an end of playback of multimedia content (e.g. running of a slide show, starting of a projection of a film, etc.); an opening or a closing of a door; turning on or off of the lights, etc.

According to one embodiment, the device APP detects an activity ACT_A being performed by at least one person PERS_X-PERS_Y present in the first location LOC_1.

According to one example, the device APP detects based on images DATA_A acquired by a camera SENS_A that a person PERS_X gets up, approaches a board and begins a presentation. Thus, the device APP detects in the first location LOC_A an activity ACT_A performed by a person PERS_X, for example characterized by the following description attribute: "A presentation is starting". According to another example, the device APP detects, based on data DATA measured by a sensor SENS, that a playback of multimedia content has started.

The details of implementation of step S20 of detecting activities based on measured data are for example described in the following documents: Florea et al., "Multimodal Deep Learning for Group Activity Recognition in Smart Office Environments", Future Internet, 2020; Krishnan et al., "Activity recognition on streaming sensor data", Pervasive and Mobile Computing, Volume 10, 2014.

Furthermore, the device APP can identify persons PERS_X-PERS_Y associated with detected activities ACT_A. Such a person identification step can in particular be implemented by using voice or facial recognition techniques, or by operating a network probe and the identifier of a terminal associated with a person, etc. For example, the device APP, based on images DATA_A acquired by a camera SENS_A, can detect that a person PERS_X has entered the meeting room LOC_A and obtain an identifier of this person PERS_X.

It is important to point out that the detection of said at least one activity ACT_A in step S20 triggers the implementation by the device APP of steps S50-S70 described below. In other words, steps S50-S70 are performed if, and only if, said at least one activity ACT_A is detected, and in particular immediately following the detection (i.e. under a time constraint).

In step S50, an obtainer OBT of the device APP obtains at least one link LNK between said at least one user USR_1 and said at least one first detected activity ACT_A.

In the context of the disclosed technology, a "link between a user and an activity" refers to any direct or indirect association between a detected activity and a user. More specifically, it is considered below that a link between a user and an activity is characterized by the type of association between the user and the activity. For example, a link between a user USR_1 and a detected activity ACT_A can belong to the following types:

- a link between the user USR_1 and the activity ACT_A itself, e.g. the user USR_1 is an employee of a company whose actions are performed as a function of detected activities ACT_A;
- a link between the user USR_1 and an event associated with the activity ACT_A, e.g. the user USR_1 is registered as a participant in a meeting for which an activity ACT_A is detected such as running of a slide show;
- a link between the user USR_1 and the location LOC_A in which the activity ACT_A is performed, e.g. the user USR_1 is responsible or owner of the location LOC_A in which the activity ACT_A takes place;
- a link between the user USR_1 and a person PERS_X associated with the activity ACT_A, e.g. the user USR_1 is an employee of the company managed by the person PERS_X, the user USR_1 is a relative of the person PERS_X performing the activity ACT_A.

Particularly, said at least one link LNK is obtained by the device APP based on an identifier of said at least one user USR_1 and on the description attribute of the first activity ACT_A.

The example described above is taken here, the device APP has detected in step S20 the beginning of a presentation ACT_A in the first location A. The device APP obtains in step S30 a list LNK of the participants registered for this presentation ACT_A, the list of participants LNK comprising an identifier of the user USR_1.

Moreover, the device APP can also determine in step S50 that the user USR_1 is not linked to the detected activity ACT_A and, thus, no link is obtained. In this case, the method continues in step S10 and the device APP continues to monitor the ongoing activities in the first location LOC_A.

In step S60, a generator GEN of the device APP analyzes said at least one first activity ACT_A and said at least one link LNK, then generates accordingly at least one activity recommendation REC_1.

Within the meaning of the disclosed technology, "an activity recommendation" refers to a message intended for at least one user comprising a suggestion (proposal) of at least one action to be performed and characterized by a description attribute (e.g. a character string). In particular, an activity recommendation can suggest a user: to perform a certain activity; to perform an activity in addition to or instead of a first activity, or not do a certain activity.

Let us continue the example described above: the beginning of a presentation ACT_A was detected in the first location LOC_A; and the user USR_1 is linked to this presentation ACT_A as a participant. So, according to this example, the activity recommendation REC_1 can tell the user USR_1 to go to the first location LOC_A in order to attend the ongoing presentation.

According to one embodiment, the activity recommendation REC_1 is generated by an artificial neural network. For example, the neural network can take as input a description attribute of said at least one first detected activity ACT_A and said at least one link LNK (e.g. a type of link), and provide as output a recommendation ACT_A.

As a variant, embodiments could be envisaged in which the activity recommendation REC_1 is generated by using a set of predefined rules.

It is noted that the device APP can also in step S60 determine as a function of said at least one detected activity ACT_A and of said at least one link LNK that no activity recommendations are necessary or appropriate for said at least one user USR_1. In this case, the method continues in step S10 and the device APP continues to monitor the ongoing activities in the first location LOC_A.

In step S70, the device APP sends said at least one activity recommendation REC_1 to said at least one terminal UE_1 of said at least one user USR_1 via a communication network.

According to one embodiment, said at least one activity recommendation REC_1 is sent to only one user USR_1. As a variant, said at least one activity recommendation REC_1 can be sent to several terminals associated with distinct users. Moreover, an activity recommendation can be sent to a plurality of terminals of the same user (e.g. a laptop computer, and a telephone).

In accordance with the disclosed technology, a terminal can refer to any type of terminal such as a laptop or desktop computer, a telephone, a Smartphone, a tablet, a projector, etc.

Particularly, said at least one terminal UE_1 is configured to receive said at least one activity recommendation REC_1 and to reproduce it, for example by using a screen or a speaker.

Thus, the proposed device APP allows to provide in real time up-to-date and personalized activity recommendations for a user by taking into account ongoing activities in a remote location.

It should be pointed out that the detection of the activity performed in the remote location triggers the generation and the sending of the recommendation, which is thus provided in real time to the user. Furthermore, the recommendation proposed to the user is generated both as a function of the detected ongoing activity and of the link between the user and the detected activity, which allows to obtain an up-to-date and personalized recommendation for the user.

For example, the proposed device APP can be used to implement a decision support system making it possible to optimize the hardware (e.g. the meeting rooms of a company) or time (e.g. the schedule of a user) resources.

Other embodiments of the disclosed technology in which the device APP implements additional steps and functionalities will be detailed below, with reference to FIGS. 2A and 2B.

FIG. 2A and FIG. 2B respectively represent one example of architecture of a system and the steps of an activity recommendation method according to one embodiment of the disclosed technology.

Particularly, these figures illustrate one embodiment in which the device APP introduced above sends to a user an activity recommendation as a function of the current activity of the user.

To this end, the system SYS comprises according to this embodiment a second set of at least one sensor SENS_B located in the second location LOC_B. This assembly SENS_B can comprise at least one sensor from: a camera; a microphone; a network probe; a pressure sensor; a temperature sensor; a depth sensor; and a thermal camera.

The operation of the proposed device APP according to this embodiment is detailed below, with reference to the steps of FIG. 2B.

As illustrated in FIG. 2B, and according to this embodiment, the device APP implements the proposed activity recommendation method comprising at least one of the steps S10 to S80 described below.

In steps S10 and S20, the device APP obtains first data DATA_A measured by the first set of sensors SENS_A and detects at least one first ongoing activity ACT_A in the first location LOC_A. The implementation of steps S10-S20 by the device APP is identical to the one described with reference to FIGS. 1A and 1B.

In steps S30 and S40, the device APP obtains second data DATA_B measured by the second set of sensors SENS_A and detects based thereon at least one second activity ACT_B being performed by said at least one user USR_1.

The implementation of steps S30-S40 is in particular analogous to the implementation of steps S10-S20.

It should be pointed out that steps S10-S20 and S30-S40 can be performed in parallel (concomitantly or simultaneously), or sequentially (in any order). For example, the activity ACT_B of a user USR_1 can be detected before the ongoing activity ACT_A in the first LOC_A location, or vice versa.

In step S50, the device APP obtains at least one link LNK between said at least one user USR_1 and said at least one first detected activity ACT_A.

To this end, according to the embodiment illustrated in FIG. 2B, the device APP implements at least one of the steps S51 and S52.

In step S51, the device APP obtains a link called fixed link LNK_FIX between said at least one user USR_1 and at least one person PERS_X-PERS_Y associated with said at least one first activity ACT_A.

As illustrated in FIG. 2A, the fixed link LNK_FIX is recorded in a database DB. The fixed link LNK_FIX can thus be obtained based on an identifier of said at least one user USR_1 and on an identifier of said at least one person PERS_X-PERS_Y.

For example, a user USR_1 and a person PERS_X can be linked by the fact of belonging to the same company, or of being registered for the same event such as a meeting.

In step S52, the device APP determines at least one link called dynamic link LNK_DYN between said at least one user USR_1 and said at least one first detected activity ACT_A.

Particularly, the dynamic link LNK_DYN is determined as a function of said at least one user USR_1 and of said at least one first activity ACT_A based on a set of decision rules.

In particular, the dynamic link can be established between said at least one user USR_1 and the first location LOC_A in which the first activity ACT_A is performed.

Assuming that the first activity ACT_A is detected in the first location LOC_A and that the first location LOC_A is under the responsibility of the user USR_1, then the device APP can determine that the user USR_1 is bound by his responsibility to the first activity ACT_A.

As a variant, the dynamic link LNK_DYN can be established between said at least one user USR_1 and at least one person PERS_X-PERS_Y associated with the first activity ACT_A.

For example, if the first detected activity ACT_A in the first location LOC_A is identical to the second activity ACT_B being performed by the user USR_1 in the second location LOC_B, then the device APP can determine that the user USR_1 and the persons PERS_X-PERS_Y are linked by the fact of performing the same activity.

Thus, according to this embodiment, said at least one link LNK comprises the fixed link LNK_FIX and/or the dynamic link LNK_DYN.

In step S60, the device APP generates at least one activity recommendation REC_1 as a function of said at least one first activity ACT_A, of said at least one link LNK and of said at least one second activity ACT_B.

As mentioned previously, according to this embodiment, the proposed device APP uses the activity being performed by a user to generate an activity recommendation. Thus, the activity recommendations provided to a user are dynamically adapted to his current situation.

According to one embodiment, said at least one recommendation REC_1 is generated by a neural network taking as input: a description attribute of said at least one first activity ACT_A; a description attribute of said at least one second activity ACT_B; and said at least one link LNK.

In step S70, the device APP sends, to said at least one terminal UE_1, said at least one activity recommendation REC_1 as well as a representative information (e.g. a description attribute) of said at least one detected activity ACT_A.

It is proposed here to send to the user USR_1 both the recommendation REC_1 and the detected activity ACT_A having triggered this recommendation REC_1. This allows to contextualize the recommendation REC_1 and therefore to motivate the sending of this recommendation REC_1 to the user USR_1.

In step S80, the device APP obtains at least one data FDBK indicating whether or not said at least one user has followed or not said at least one activity recommendation.

According to one embodiment, the device APP obtains said at least one data FDBK by detecting, based on second measured data DATA_B, whether the user USR_1 has modified his activity to follow the recommendation REC_1 which was sent to him. In other words, according to this embodiment, the device APP checks whether or not a detected activity being performed by the user USR_1 corresponds to a previously sent activity recommendation REC_1.

As a variant, the device APP can obtain said at least one data FDBK by receiving a message from the terminal UE_1 indicating whether or not the user USR_1 has followed the activity recommendation REC_1. It can be for example a message issued following a response from the user USR_1 (acceptance or not of the recommendation) obtained via an interface of the terminal UE_1.

According to one embodiment, the device APP updates, based on said at least one obtained data FDBK, parameters (e.g. weights) of the neural network used to generate the activity recommendations. Thus, the neural network is optimized over time by taking into account the relevance of the recommendations made to a user.

It should be noted that the proposed activity recommendation method can comprise one or more iterations of each of these steps. In particular, embodiments are described below with reference to FIGS. 3A-3C, according to which the device APP, following the detection of an activity ACT_A, generates and sends a plurality of activity recommendations for several users.

FIG. 3A, FIG. 3B and FIG. 3C represent examples of data obtained and processed by an activity recommendation system according to one embodiment of the disclosed technology. More specifically, these figures illustrate over time activities performed by several users or persons as well as activity recommendations provided to them.

Three embodiments of steps S60 and S70 concerning the generation and the sending of activity recommendations to users are also described below with reference to FIGS. 3A, 3B and 3C.

According to a first embodiment, illustrated by FIG. 3A, the device APP sends to a user USR_1 an activity recommendation REC_1 generated as a function of a detected activity A1_PX of a person PERS_X and of the activity A1_U1 of the user USR_1.

As an example, FIG. 3A illustrates a situation in which following the activity recommendation REC_1, the user USR_1 interrupts his activity A1_U1 to perform another activity A2_U1 as recommended.

The first embodiment described here thus corresponds to the operation of the device APP as previously described with reference to FIGS. 2A and 2B.

In addition, other embodiments of the disclosed technology are also proposed in which an interference mechanism (i.e. chain reaction) between the recommendations provided to the users is used. These embodiments are in particular illustrated in FIGS. 3B and 3C.

According to a second embodiment, illustrated in FIG. 3B, the device APP sends to a first user USR_1 an activity recommendation REC_1 generated as a function of a detected activity A1_PX. In addition, the device APP sends to a second user USR_2 an activity recommendation REC_2 generated as a function of the activity recommendation REC_1 sent to the first user USR_1.

More particularly, the activity recommendation REC_2 is also generated as a function of a link between the second user USR_2 and said at least one activity recommendation REC_1. Such a link can be obtained by the device APP in a manner similar to step S50 described above. For example, the link can be obtained based on identifiers of the users USR_1 and USR_2 and on the description attribute of the recommendation REC_1.

It could also be envisaged to generate the recommendation REC_1 as a function of the current activity A1_U1 of the first user USR1 and to generate the recommendation REC_2 as a function of the current activity A1_U2 of the second user USR2.

FIG. 3B illustrates a situation in which following the activity recommendations REC_1 and REC_2, the users USR_1 and USR_2 respectively perform activities A2_U1 and A2_U2.

In fact, it is proposed in this second embodiment to take into account the activity recommendation provided to a user to influence the activity of another user.

For example, assuming that a recommendation REC_1 is sent to a user USR_1 telling him to go to a meeting room LOC_B to attend a starting project progress meeting ACT_A. Furthermore, the user USR_1 is working on this project with another user USR_2. Then, according to this embodiment, the device APP also sends a recommendation REC_2 to the user USR_2 to suggest him to participate in the meeting ACT_A.

This second embodiment allows to coordinate the activities of several users. The device APP could thus be used to collectively optimize the management of resources shared between several users (e.g. meeting rooms).

According to a third embodiment, illustrated in FIG. 3C, a person associated with a detected activity A1_U2 is a user USR_2.

Thus, according to this embodiment, the device APP sends to the user USR_1 an activity recommendation REC_1 generated following the detection of the activity A1_U2 of the user USR_2.

Moreover, the device APP can also send to the user USR_2 an activity recommendation REC_2 generated as a function of the activity recommendation REC_1 sent to the first user USR_1, as previously described.

FIG. 4 represents an example of software and hardware architecture of an activity recommendation system according to one embodiment of the disclosed technology.

The activity recommendation system SYS comprises, according to one embodiment illustrated in FIG. 4, at least one of the following elements:

- an activity recommendation device APP;
- a first set of at least one sensor SENS_A configured to capture first measured data DATA_A and to communicate with the device APP;
- a second set of at least one sensor SENS_B configured to capture second measured data DATA_B and to communicate with the device APP;
- at least one user terminal UE_1 configured to communicate with the device APP and to reproduce an activity recommendation REC_1; and
- a database DB on which at least one link LNK_FIX is recorded between at least one user USR_1 and at least one person PERS_X, PERS_Y.

According to one embodiment, the first SENS_A and the second SENS_B set of sensors are comprised in the activity recommendation device APP.

According to one embodiment, the system SYS is a decision support system for said at least one user USR_1.

The activity recommendation device APP comprises, according to one embodiment illustrated in FIG. 4: at least one processing unit or processor PROC; and at least one memory MEM.

More particularly, the device APP has, according to one embodiment, the hardware architecture of a computer. As such, the device APP can comprise a processor PROC, a random access memory, a read only memory MEM and a non-volatile memory. The memory MEM associated with the device APP constitutes an information medium conforming to the disclosed technology, readable by computer and by the processor PROC, on which a computer program PROG conforming to the disclosed technology is recorded. The computer program PROG includes instructions for implementing steps of an activity recommendation method conforming to the disclosed technology, when the program PROG is executed by the processor PROC.

The computer program PROG defines functional and software modules of the monitoring device APP described below with reference to FIG. 5.

As illustrated in FIG. 4, according to one embodiment, the device APP has a communication device COM configured to communicate via a communication network with at least one of the following elements: the first set of at least one sensor SENS_A; the second set of at least one sensor SENS_B; the database DB; and said at least one terminal UE_1. No limitation is attached to the nature of the communication interfaces between these devices, which can be wired or non-wired, and can implement any protocol known to those skilled in the art.

FIG. 5 schematically represents one example of functional architecture of an activity recommendation device according to one embodiment of the disclosed technology.

Generally, for each step (or operation) of an activity recommendation method conforming to the disclosed technology, the device APP can comprise a corresponding element configured to perform said step.

Particularly, according to the embodiment illustrated in FIG. 5, the activity recommendation device APP comprises at least one of the following elements:

- a receiver RCV configured to receive data DATA_A-DATA_B measured by at least one set of sensors SENS_A-SENS_B;
- a detector DET configured to detect at least one activity ACT_A-ACT_B based on measured data DATA_A-DATA_B;
- an obtainer OBT configured to obtain at least one link LNK between at least one user USR_1 and at least one detected activity ACT;
- a generator GEN configured to generate at least one activity recommendation REC_1 for at least one user USR_1 as a function of at least one detected activity ACT_A-ACT_B and of at least one link LNK; and
- a transmitter SND configured to send at least one activity recommendation REC_1 to at least one terminal UE_1.

Examples of use of the proposed activity recommendation system APP are presented below for illustrative purposes, these examples being devoid of any limitation.

According to a first exemplary implementation, two users USR_1 and USR2 are registered to participate in a presentation planned in a meeting room LOC_A. However, the users USR_1 and USR_2 suspect that the presentation will start late and would like to take the opportunity to do something else. For this reason, the user USR_1 remains at his desk LOC_B to continue working; and the user USR_2 is having a coffee in the cafeteria. The device APP detects, based on first data DATA_A measured by sensors SENS_A installed in the meeting room LOC_A, the running of a slide show ACT_A and therefore detects that the presentation begins. Upon detection of the running of the slide show ACT_A, the device APP generates for the users USR_1 and USR_2 an activity recommendation REC_1 suggesting going to the meeting room LOC_A. In particular, for the user USR_1 located at his office, the activity recommendation REC_1 is sent to his computer UE_1 and, for the user USR_2 located in the cafeteria, the activity recommendation REC_1 is sent to his mobile phone. Thus, thanks to the proposed device APP, the users USR_1 and USR_2 were able to optimize their time management and to get to the meeting room LOC_A in due course when the presentation begins.

According to a second exemplary implementation, a user USR_1 is playing ACT_B alone in his apartment LOC_A. The activity recommendation device APP detects, based on second data DATA_B measured by sensors SENS_B located in the apartment LOC_B, the game activity ACT_B being performed by the user USR_1. Furthermore, the device APP detects that other persons PERS_X-PERS_Y start playing ACT_A in a common room LOC_A in the building of the user USR_1. The device APP then sends an activity recommendation REC_1 to a terminal UE_1 of the user USR_1. The activity recommendation REC_1 tells the user USR_1 that persons PERS_X-PERS_Y are also playing ACT_A in the common room LOC_A and suggests the user USR_1 to join them. This second example illustrates in particular the fact that the proposed device APP allows to provide in real time up-to-date and personalized activity recommendations for a user by taking into account ongoing activities in a remote location. As such, the recommendations provided by the proposed device APP are relevant to the users.

According to a third exemplary implementation, a user USR_1 participates, remotely from his home LOC_B, in a presentation made by a speaker PERS_X in an amphitheater LOC_A. The user USR_1 assumes that the presentation will continue like this without any intervention on his part being necessary, and therefore decides to leave his office ACT_B momentarily. However, the speaker PERS_X interrupts his presentation and begins interacting ACT_A with the participants. The device APP detects the new activity ACT_A of the speaker PERS_X as well as the activity ACT_B of the user USR_1 and consequently sends an activity recommendation REC_1 telling the user USR_1 to return to his desk. The user USR_1 thus quickly returns to his desk and can interact with the speaker PERS_X as if he had not been absent.

It should be noted that the order in which the steps of a method conforming to the disclosed technology follow each other, in particular with reference to the appended drawings, constitutes only one exemplary embodiment devoid of any limitation, variants being possible. Particularly, a method conforming to the disclosed technology can comprise one or more iterations of the steps described above, in particular with reference to the attached drawings. Furthermore, the reference signs do not limit the scope of protection, their sole function being to facilitate the understanding of the claims.

A person skilled in the art will understand that the embodiments and variants described above constitute only non-limiting exemplary implementation of the disclosed technology. Particularly, those skilled in the art may envisage any adaptation or combination of the embodiments and variants described above in order to meet a very specific need.

The invention claimed is:

1. A method for recommending activities to at least one user, the method comprising:

detecting at least one first ongoing activity in a first location based on data measured by at least one sensor, and triggered by the detection of said at least one first ongoing activity, sending, to at least one terminal of said at least one user located in a second location, at least one activity recommendation generated as a function of:

said at least one first activity, and at least one link between said at least one user and said at least one first activity.

2. The method of claim 1, wherein said at least one activity recommendation is generated further as a function of a second detected activity being performed by said at least one user.

3. The method of claim 1, wherein said at least one link comprises at least one link among:

a fixed link between said at least one user and at least one person associated with said at least one first activity, the fixed link being recorded in a database and being obtained based on an identifier of said at least one user and on an identifier of said at least one person; or a dynamic link between said at least one user and said at least one first activity, the dynamic link being determined as a function of said at least one user and of said at least one first activity.

4. The method of claim 1, further comprising sending, to a terminal of another user, another activity recommendation generated as a function of:

said at least one activity recommendation, and a link between the other user and said at least one activity recommendation.

5. The method of claim 1, wherein said at least one activity recommendation and information representative of said at least one first detected activity are sent to said at least one terminal of said at least one user.

6. The method of claim 1, wherein said at least one activity recommendation is generated by a neural network.

7. The method of claim 6, further comprising updating parameters of the neural network based on a data indicating whether or not said at least one user has followed or not said at least one activity recommendation.

8. The method of claim 1, wherein the first location is a meeting room equipped with said at least one sensor.

9. The method of claim 1, further comprising obtaining said data measured by said at least one sensor, the obtained data being used to detect said at least one first activity.

10. A non-transitory computer-readable medium having stored thereon instructions which, when executed by a processor, cause the processor to implement the method of claim 1.

11. An activity recommendation device comprising a transmitter, the activity recommendation device configured to, upon detection of at least one first ongoing activity in a first location based on data measured by at least one sensor:

send, to at least one terminal of at least one user located in a second location, at least one activity recommendation generated as a function of:

said at least one first activity, and at least one link between said at least one user and said at least one first activity.

12. A system comprising:

an activity recommendation device comprising a transmitter, the activity recommendation configured to, upon detection of at least one first ongoing activity in a first location based on data measured by at least one sensor, send, to at least one terminal of at least one user located in a second location, at least one activity recommendation generated as a function of:

said at least one first activity, and at least one link between said at least one user and said at least one first activity; and said at least one terminal configured to receive, from the activity recommendation device, said at least one activity recommendation.

13. The system of claim 12, further comprising a set of at least one sensor configured to capture measured data and to communicate with said activity recommendation device.

14. The system of claim 13, wherein the set of at least one sensor comprises at least one sensor among:

a camera;

a microphone;

a network probe;

a pressure sensor;

a temperature sensor;

a depth sensor; or a thermal camera.

* * * * *